United States Patent
Kim et al.

(10) Patent No.: US 10,560,915 B2
(45) Date of Patent: Feb. 11, 2020

(54) METHOD FOR PERFORMING LOCATION REGISTRATION BY REMOTE UE IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Sungduck Chun, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/098,427

(22) PCT Filed: May 2, 2017

(86) PCT No.: PCT/KR2017/004645
§ 371 (c)(1),
(2) Date: Nov. 1, 2018

(87) PCT Pub. No.: WO2017/191973
PCT Pub. Date: Nov. 9, 2017

(65) Prior Publication Data
US 2019/0182789 A1    Jun. 13, 2019

Related U.S. Application Data

(60) Provisional application No. 62/344,951, filed on Jun. 2, 2016, provisional application No. 62/337,895, filed on
(Continued)

(51) Int. Cl.
*H04W 4/00*     (2018.01)
*H04W 60/04*    (2009.01)
(Continued)

(52) U.S. Cl.
CPC .............. *H04W 60/04* (2013.01); *H04W 8/08* (2013.01); *H04W 36/125* (2018.08);
(Continued)

(58) Field of Classification Search
CPC . H04W 68/02; H04W 52/0212; H04W 60/04; H04W 76/50; H04W 76/14; H04W 36/125; H04W 40/22; H04W 88/04
USPC ................ 455/435.1, 550.1, 456.1, 11.1
See application file for complete search history.

(56) References Cited

U.S. PATENT DOCUMENTS

| 9,516,572 B1 * | 12/2016 | Velusamy ............ H04W 36/32 |
| 2010/0016009 A1 * | 1/2010 | Andersson ............ H04W 52/08 455/522 |

(Continued)

OTHER PUBLICATIONS

PCT International Application No. PCT/KR2017/004645, Written Opinion of the International Searching Authority dated Aug. 24, 2017, 18 pages.

(Continued)

*Primary Examiner* — Danh C Le
(74) *Attorney, Agent, or Firm* — Lee Hong Degerman Kang Waimey

(57) ABSTRACT

One embodiment of the present invention relates to a method for performing location registration by a remote user equipment (UE) in a wireless communication system, the method comprising the steps of: transmitting a direct communication request message to a relay UE; receiving, from the relay UE, a direct communication response message including location registration period information and location registration performing time information, in response to the direct communication request message; and when the location registration performing time information expires, transmitting a first TAU request message to an MME, wherein the location registration period information is applied after the application of the location registration performing time information.

13 Claims, 12 Drawing Sheets

Related U.S. Application Data on May 18, 2016, provisional application No. 62/336,734, filed on May 15, 2016, provisional application No. 62/335,699, filed on May 13, 2016, provisional application No. 62/330,254, filed on May 2, 2016.

(51) Int. Cl.

| | |
|---|---|
| *H04W 8/08* | (2009.01) |
| *H04W 76/00* | (2018.01) |
| *H04W 76/10* | (2018.01) |
| *H04W 76/50* | (2018.01) |
| *H04W 76/14* | (2018.01) |
| *H04W 36/12* | (2009.01) |
| *H04W 40/22* | (2009.01) |
| *H04W 88/04* | (2009.01) |

(52) U.S. Cl.
CPC ........... *H04W 40/22* (2013.01); *H04W 76/00* (2013.01); *H04W 76/10* (2018.02); *H04W 76/14* (2018.02); *H04W 76/50* (2018.02); *H04W 88/04* (2013.01)

(56) References Cited

U.S. PATENT DOCUMENTS

| | | | | |
|---|---|---|---|---|
| 2011/0195714 A1* | 8/2011 | Sawinathan | ........ | H04W 60/005 455/435.1 |
| 2011/0256981 A1* | 10/2011 | Saito | ..................... | B60W 10/06 477/183 |
| 2013/0070721 A1* | 3/2013 | Zheng | ..................... | H04W 8/26 370/329 |
| 2013/0150036 A1* | 6/2013 | Pattaswamy | .......... | H04W 8/183 455/435.1 |
| 2014/0349570 A1 | 11/2014 | Pan et al. | | |
| 2015/0029866 A1 | 1/2015 | Liao et al. | | |
| 2016/0128020 A1* | 5/2016 | Agarwal | ............... | H04W 68/04 370/328 |
| 2016/0255584 A1* | 9/2016 | Mutikainen | ....... | H04W 52/0216 370/311 |
| 2016/0374446 A1* | 12/2016 | Belem de Assis Marinho | ............ | A45D 7/04 132/200 |

OTHER PUBLICATIONS

Sony, "Scope and phasing of D2D Relay enhancements", 3GPP TSG RAN WG2 NB-Meeting #93bis, R2-162636, Apr. 2016, 7 pages.

Huawei, et al., "Discussion on conditions for Relay and Remote UE operation", 3GPP TSG RAN WG2 Meeting #93bis, R2-162158, Apr. 2016, 3 pages.

Fujitsu, "Consideration on the Enhancement of UE-to-Network Relay", 3GPP TSG RAN WG2 Meeting #93bis, R2-162240, Apr. 2016, 3 pages.

\* cited by examiner

FIG. 13

| 8 | 7 | 6 | 5 | 4 | 3 | 2 | 1 | |
|---|---|---|---|---|---|---|---|---|
| \multicolumn{8}{c}{EPS network feature support IEI} | octet 1 |
| \multicolumn{8}{c}{Length of EPS network feature support contents} | octet 2 |
| Spare 0 Spare | EAw/o PDN | ESR PS | CS-LCS | | EPC-LCS | EMC BS | IMS VoPS | octet 3 |

FIG. 14

```
IMS voice over PS session indicator (IMS VoPS) (octet 3, bit 1)

Bit
1
0          IMS voice over PS session in S1 mode not supported
1          IMS voice over PS session in S1 mode supported Emergency bearer services indicator (EMC BS) (octet 3, bit 2)

Bit
2
0          emergency bearer services in S1 mode not supported
1          emergency bearer services in S1 mode supported Location services indicator in EPC (EPC-LCS) (octet 3, bit 3)

Bit
3
0          location services via EPC not supported
1          location services via EPC supported Location services indicator in CS (CS-LCS) (octet 3, bit 4 to 5)

Bit
5  4
0  0       no information about support of location services via CS domain is available
0  1       location services via CS domain supported
1  0       location services via CS domain not supported
1  1       reserved Support of EXTENDED SERVICE REQUEST for packet services (ESRPS)
(octet 3, bit 6)

Bit
6
0          network does not support use of EXTENDED SERVICE REQUEST to request for
           packet services
1          network supports use of EXTENDED SERVICE REQUEST to request for packet
           services EPS attached w/o PDN connectivity (EAw/oPDN)
(octet 3, bit 7)
This bit indicates the capability for EPS attached without PDN connectivity
Bit
6
0          EPS attached without PDN connectivity not supported
1          EPS attached without PDN connectivity supported Bit 8 of octet 3 is spare and shall be coded as zero.
```

METHOD FOR PERFORMING LOCATION REGISTRATION BY REMOTE UE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/004645, filed on May 2, 2017, which claims the benefit of U.S. Provisional Application No. 62/330,254, filed on May 2, 2016, 62/335,699, filed on May 13, 2016, 62/336,734, filed on May 15, 2016, 62/337,895, filed on May 18, 2016 and 62/344,951, filed on Jun. 2, 2016, the contents of which are all hereby incorporated by reference herein in their entirety.

TECHNICAL FIELD

The following description relates to a wireless communication system, and more particularly, to a method and apparatus for performing location registration by a remote user equipment (UE).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication refers to a communication scheme in which a direct link is established between user equipments (UEs), and voice and data are directly transmitted and received between the UEs without intervention of an evolved Node B (eNB). D2D communication may include UE-to-UE communication and peer-to-peer communication. Further, D2D communication may be applied to machine-to-machine (M2M) communication, and machine type communication (MTC).

D2D communication is considered as a solution to reduce the burden of an eNB, caused by rapidly increasing data traffic. For example, since data is transmitted and received between devices without intervention of an eNB in D2D communication, unlike a legacy wireless communication system, the overhead of the network can be reduced. In addition, it may be expected that the introduction of D2D communication will bring about the effects of simplified procedures in an eNB, reduction of the power consumption of devices participating in D2D communication, increased data rates, increased accommodation capability of a network, load distribution, and extension of cell coverage.

At present, vehicle to everything (V2X) communication is under discussion in conjunction with D2D communication. V2X communication conceptually covers vehicle-to-vehicle (V2V) communication between vehicle terminals, vehicle-to-pedestrian (V2P) communication between a vehicle and another type of terminal, and vehicle to infrastructure (V2I) communication between a vehicle and a roadside unit (RSU).

DISCLOSURE

Technical Problem

An aspect of the present invention is to provide a method of efficiently managing location registration of a remote user equipment (UE).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an embodiment of the present invention, a method of performing location registration by a remote user equipment (UE) in a wireless communication system includes transmitting a direct communication request message to a relay UE, receiving, from the relay UE, a direct communication response message including location registration period information and location registration action time information in response to the direct communication request message, and upon expiration of the location registration action time information, transmitting a first tracking area update (TAU) request message to a mobility management entity (MME). The location registration period information is applied after the location registration action time information is applied.

In an embodiment of the present invention, a remote UE for performing location registration in a wireless communication system includes a transceiver and a processor. The processor is configured to transmit a direct communication request message to a relay UE through the transceiver, to receive, from the relay UE through the transceiver, a direct communication response message including location registration period information and location registration action time information in response to the direct communication request message, and to, upon expiration of the location registration action time information, transmit a first TAU request message to an MME. The location registration period information is applied after the location registration action time information is applied.

The location registration period information may be a time period starting from the expiration of the location registration action time information.

After transmitting the first TAU request message, the remote UE may transmit a second TAU request message after expiration of a time corresponding to the location registration period information.

The location registration action time information may correspond to a time from transmission of the direct communication response message to initiation of a TAU procedure at the relay UE.

The first TAU request message may include the location registration period information.

The location registration period information included in the first TAU request message may be a period configuration request for the MME receiving the first TAU request message.

The MME of the remote UE may be different from an MME of the relay UE.

The first TAU request message may be transmitted through the relay UE.

If the MME of the remote UE is identical to an MME of the relay UE, the remote UE may receive emergency call-related information from the relay UE.

The remote UE may receive, from the MME, a TAU response message including emergency call-related information in response to the transmitted TAU request message.

If the emergency call-related information indicates that IP multimedia subsystem (IMS) emergency call is not supported, the remote UE may perform radio access technology (RAT) switching.

The remote UE may make an emergency call in a switched RAT after the RAT switching.

Advantageous Effects

According to the present invention, the inefficiency involved in repeated switching of a relay user equipment (UE) to a connected state, caused by location registration of a plurality of remote UEs, can be reduced.

It will be appreciated by persons skilled in the art that the objects that could be achieved with the present invention are not limited to what has been particularly described hereinabove and other objects that the present invention could achieve will be more clearly understood from the following detailed description.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the disclosure. In the drawings:

FIG. 13 and FIG. 14 are examples of the EPS network feature support IE.

BEST MODE FOR CARRYING OUT THE INVENTION

Figure 1:
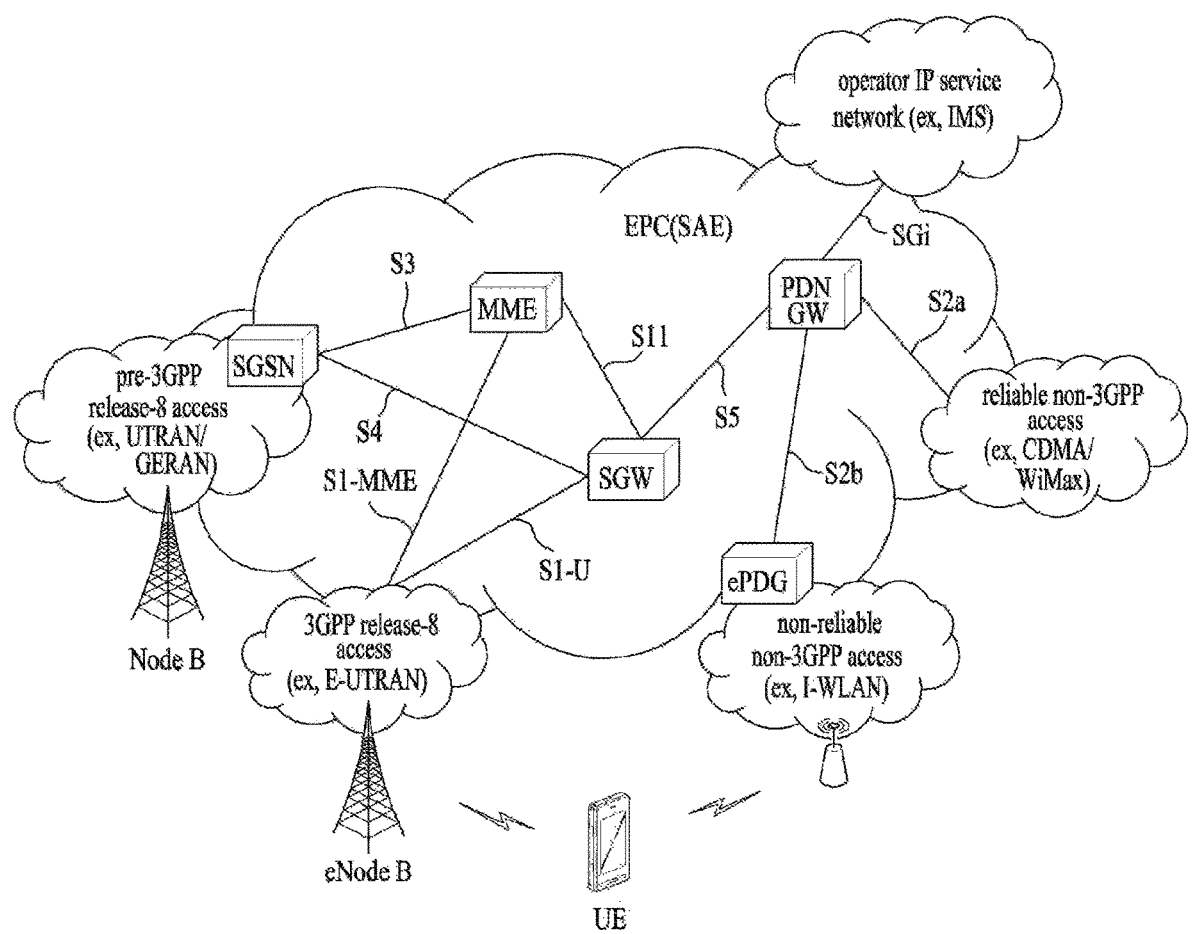
FIG. 1 is a view illustrating the structure of an evolved packet system (EPS) including an evolved packet core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
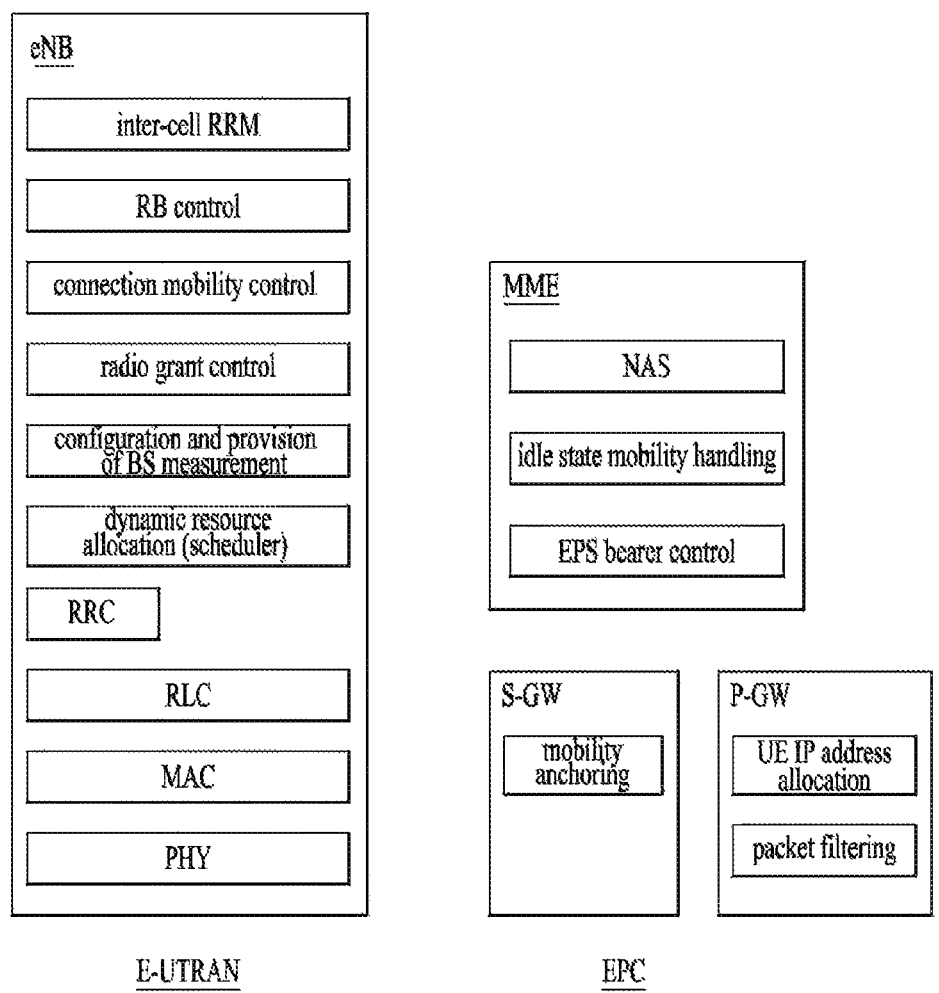
FIG. 2 is an exemplary view illustrating the architecture of a general evolved universal mobile telecommunication system (UMTS) terrestrial radio access network (E-UTRAN) and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
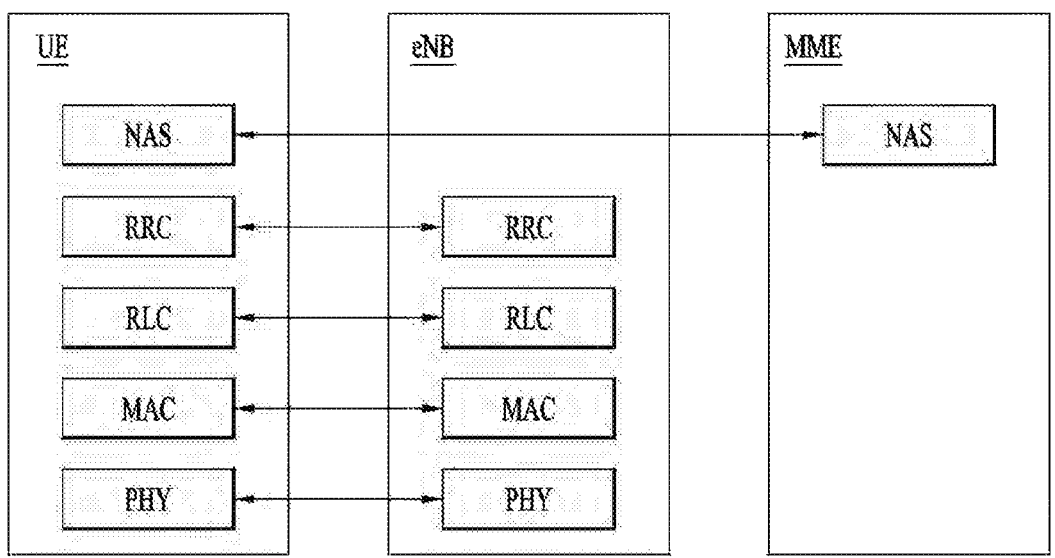
FIG. 3 is an exemplary view illustrating the architecture of radio interface protocols on a control plane.
Figure 4:
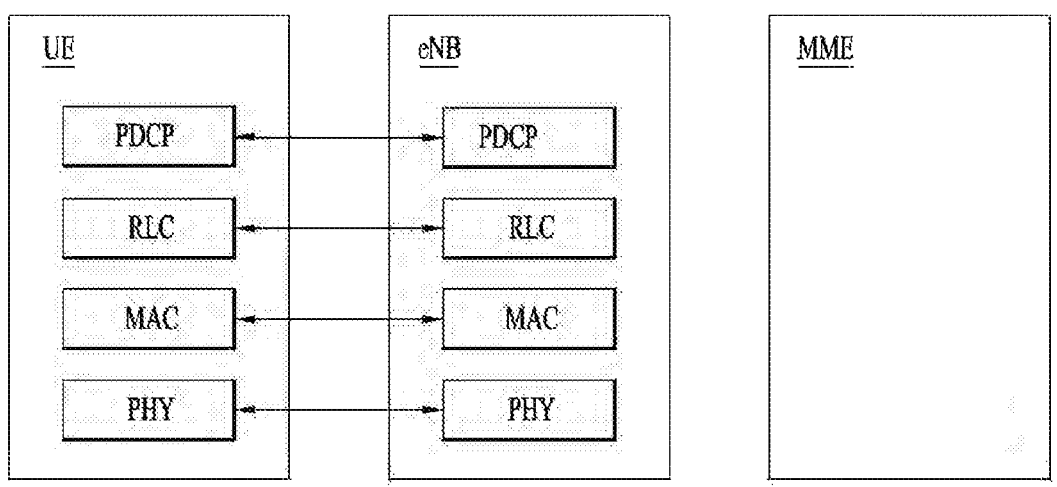
FIG. 4 is an exemplary view illustrating the architecture of radio interface protocols on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
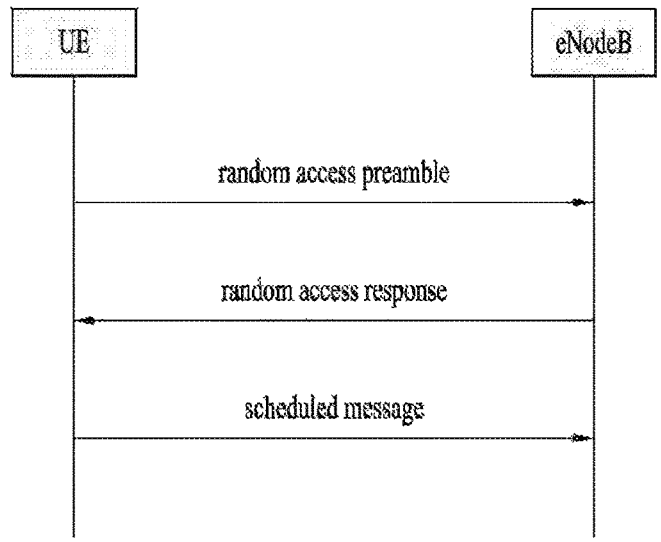
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
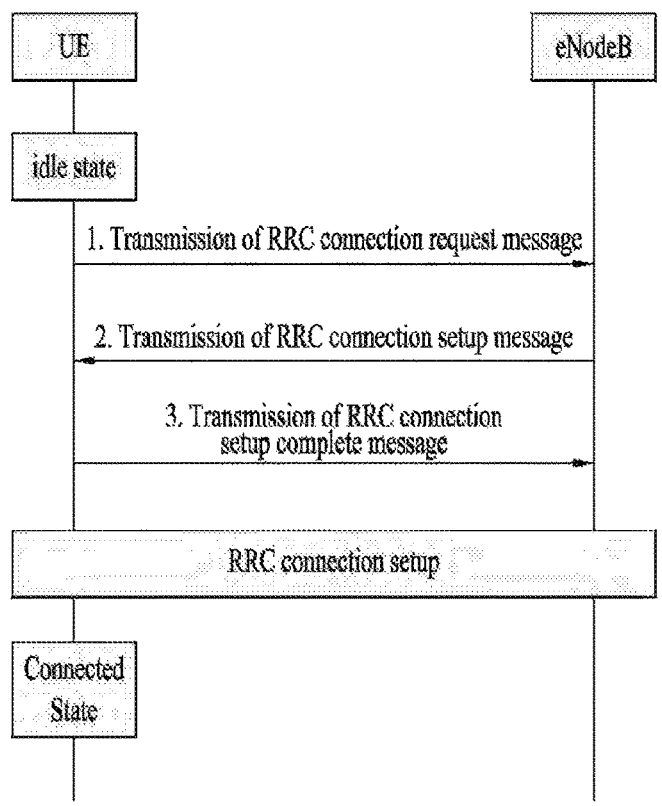
FIG. 6 is a view illustrating a radio resource control (RRC) connection procedure.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

In order to enable even a non-public safety UE to receive a network connection service through a relay UE in 3GPP Release 14, SA1 is working on service requirements. A wearable device is mainly discussed as such a UE to receive the network connection service through a relay UE. In this regard, the objective of WID (remote UE access via relay UE (REAR)) is disclosed in SP-160231. According to the service requirements (S1-161167) proposed in TS 22.278 for REAR, submitted to 3GPP SA1#74, it is proposed that a 3GPP network should also be able to identify, address, and reach a remote UE receiving the network connection service through a relay UE.

To manage the reachability of a UE, the network typically makes a UE periodically perform a location registration (tracking area update (TAU)) procedure. As the UE moves, the UE may perform a TAU operation. For the TAU operation, refer to section 5.3.3 (Tracking Area Update Procedures) in TS 23.401. For periodic TAU (P-TAU) of the UE, an MME includes timer information (a T3412 value to a T3412 extended value) in an Attach Accept message and a TAU Accept message, and the UE performs P-TAU on the basis of the timer information. For details of the operation, see section 5.3.5 in TS 24.301. If a remote UE receiving the network connection service through a relay UE is usually a wearable UE, the relay UE may generally be considered to be a smartphone. Considering that it is preferred in terms of power consumption that a smartphone saves power as much as possible, when providing a relay service to the remote UE, the relay UE preferably reduces the number/occasions of connections to the network (connection to the network may mean switching to RRC_Connected mode and/or ECM_Connected mode and/or connected mode), if possible. Accordingly, a description will be given below of methods of registering the location of a remote UE with a direct communication connection to a relay.

Embodiment 1

Embodiment 1-1

In an embodiment of the present invention, a remote UE may transmit a direct communication request message to a relay UE. The relay UE may have received timer information T1 for periodic location registration from an MME. The timer information may be included in an Attach Accept message and a TAU accept message. Subsequently, the remote UE may receive, from the relay UE, a direct communication response message including location registration period information (information about the periodicity of location registration to the network, T2) and location registration action time information (information about a time point/time at which the next location registration to the network is performed) in response to the direct communication request message. Upon expiration of the location registration action time information, the remote UE may perform a location registration procedure by transmitting a first TAU request message to an MME. For example, the remote UE may perform a TAU procedure to the MME through the relay UE at, before, or after a time T3. Herein, the remote UE may explicitly or implicitly include information indicating that the TAU procedure is TAU through a relay UE. The first TAU message may be transmitted through the relay UE.

The location registration period information may be a time period starting from the time of expiration of the location registration action time information. Further, the location registration period information may be applied after the application of the location registration action time information. That is, after a TAU request message is transmitted by first applying the location registration action time information, a TAU timer may be used on the basis of the location registration period information. After transmitting the first TAU request message, the remote UE may transmit a second TAU request message after expiration of the time period corresponding to the location registration period information. The location registration action time information may correspond to a time until the relay UE starts the TAU procedure. In this case, the remote UE may acquire synchronization to a certain degree with the TAU procedure of the relay UE by performing the TAU procedure according to the location registration action time information. If the TAU procedure of the remote UE takes place in a different time zone from that of the TAU procedure of the relay UE, the relay UE needs to switch from an RRC IDLE mode to an RRC connected state, for the TAU procedure of the remote UE. Particularly, if there are a large number of remote UEs, the relay UE should continuously switch from the RRC IDLE mode to the RRC connected state due to TAU of the remote UEs, which is inefficient in terms of the battery consumption of the relay UE. Therefore, this inefficiency may be eliminated by the foregoing configuration. More specifically, with the foregoing configuration, as the remote UE performs P-TAU to the network without being synchronized with the relay UE, switching of the relay UE from the RRC IDLE mode to the RRC connected state to transmit a signaling message of the remote UE to the network may be prevented. The effect becomes more conspicuous in the presence of more remote UEs to which the relay UE provides the relay service. That is, when the relay UE switches from the RRC IDLE mode to the RRC connected state to perform its P-TAU, the relay UE makes the remote UE also perform P-TAU, thereby preventing frequent switching to the RRC connected state.

The location registration action time information may specify an absolute time (e.g., xxxx(year) and/or xx(month) and/or xx(date) and/or xx(hour) and/or xx(minute)) or a relative time (e.g., after xx minutes). The time specified by the location registration action time information may be a time at which the relay UE is to perform TAU to the MME at the next time, before the time, or after the time. The location registration period information may correspond to a period less than, equal to, or larger than T1.

The first TAU request message may include the location registration period information. In this case, the location registration period information included in the first TAU request message may be a period configuration request for the MME that receives the first TAU request message. That is, as the remote UE provides a period value used for periodic location registration to the MME, the remote UE may request the MME to set a P-TAU period to the period value. The period value may be set as T2 or on the basis of T2, and included in the TAU Request message. Herein, the MME of the relay UE and the MME of the remote UE may be different from each other. Further, upon or before expiration of expiration of a timer set to T2 after the operation, the remote UE performs the TAU procedure to the MME through the relay UE. Herein, the remote UE may explicitly or implicitly include information indicating that the TAU procedure is TAU through a relay UE. Further, the remote UE may provide a period value for use in periodic location registration to the MME, to thereby request the MME to set the period value as a P-TAU period. The period value may be set to T2 or on the basis of T2, and included in the TAU Request message.

When the remote UE performs TAU to the MME through the relay UE, the remote UE may receive emergency call-related information from the MME. If the emergency call-related information indicates that IP multimedia subsystem (IMS) emergency call is not supported, the remote UE may perform radio access technology (RAT) switching, and then make an emergency call in circuit switched (CS) RAT. This operation will be described later in detail in Embodiment 2.

The above description relates to a case in which a remote UE establishes a new direct communication connection to a relay UE. If the relay UE is already providing the relay service to any remote UE, the relay UE may provide the remote UE with a period (T2) corresponding to a value less than, equal to, or larger than T1. The remote UE may perform a TAU procedure to the MME through the relay UE every period T2 (upon or before expiration of a timer set to T2 after T2 information is stored). Herein, the remote UE may explicitly or implicitly include information indicating that the TAU procedure is TAU through a relay UE. Further, the remote UE may provide a period value for use in periodic location registration to the MME, thus requesting the MME to set the period value as a P-TAU period. The period value may be set as T2 or on the basis of T2, and included in the TAU Request message.

When the relay UE performs periodic location registration to the MME, the relay UE may set and transmit an Active flag in order to request the MME to maintain a signaling connection even after the TAU procedure of the relay UE. This operation may prevent a remote UE which in turn provides a relay service from switching to the RRC IDLE mode and thus again switching to the RRC connected mode, when the remote UE performs a TAU procedure to the MME.

Figure 7:
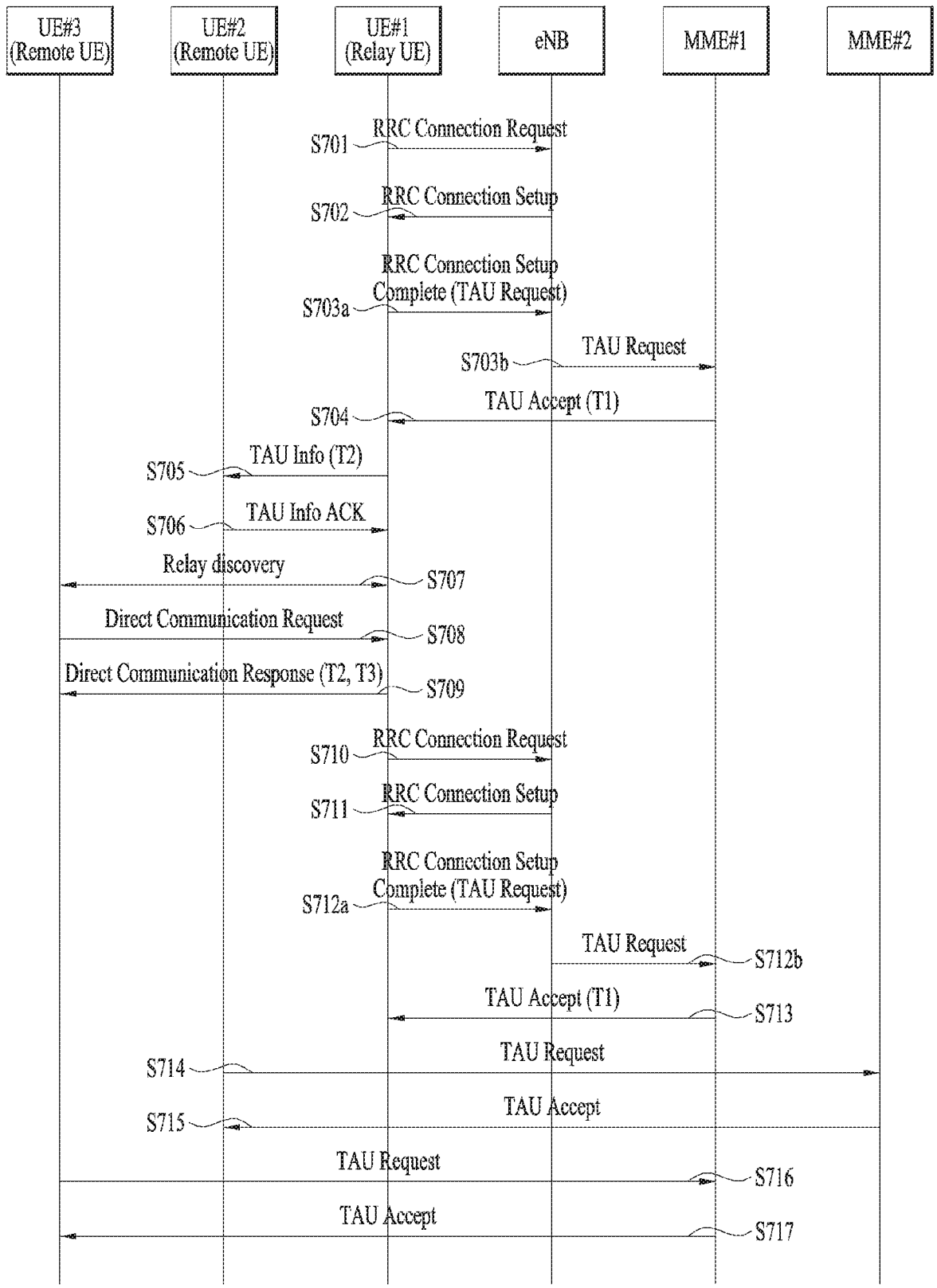
FIGS. 7 and 8 are views illustrating a location registration procedure according to an embodiment of the present invention.

FIG. 7 illustrates a specific exemplary method of allowing a relay UE not to perform periodic location registration on behalf of a remote UE(s), that is, a specific exemplary method of performing periodic location registration to a network by a remote UE. It is assumed that a relay UE, UE#1 and a remote UE, UE#2 are placed in a relay UE-to-remote UE relationship. It is also assumed that the serving MMEs of UE#1 and a remote UE, UE#3 are MME#1, and the serving MME of UE#2 is MME#2. However, both cases in which the MMEs of the UEs are all the same, and different from each other fall within the scope of the present invention.

In step S701, UE#1 is in the RRC IDLE mode, and thus transmits an RRC Connection Request message to an eNB in order to switch to the RRC connected mode. The eNB replies to UE#1 with an RRC Connection Setup message in step S702.

In step S703, UE#1 is placed in the RRC connected mode (i.e., RRC_Connected), and transmits an RRC Connection Setup Complete message including a TAU Request message to the eNB. Upon receipt of the RRC Connection Setup Complete message, the eNB forwards the TAU Request message to MME#1. The main cause of the transmission of the TAU Request message from UE#1 to the network is, but not limited to, periodic location registration. For example, movement-incurred location registration, a report caused by a change in the UE's capability/configuration, etc. are all included in the causes of the transmission of the TAU Request message from UE#1 to the network. In step S704, MME#1 replies to UE#1 with a TAU Accept message. The TAU Accept message is forwarded to UE#1 via the eNB. The TAU Accept message includes a time/period T1 at/with which UE#1 is to perform periodic location registration.

In step S705, UE#1 transmits a message providing location registration period information, TAU Info to UE#2 that provides a network connection service. The location registration period information is T2. For details of the period information T2, refer to the foregoing description. In step S706, UE#2 replies with a TAU Info ACK message.

In step S707, UE#3 searches for a relay UE in order to receive the network connection service. UE#3 transmits a request for generating a one-to-one connection to a selected relay UE, UE#1, that is, a Direct Communication Request message to UE#1 in step S708. In step S709, UE#1 replies with a Direct Communication Response message. The message includes location registration period information T2 for UE#3, and information T3 about a time point/time at which UE#3 is to perform location registration to the network later. For details of T2 and T3 values, refer to the foregoing description.

It is assumed that UE#1 is placed in the RRC IDLE mode after step S704. As a T1-based timer expires, UE#1 is to perform location registration to the network in step S7010. Therefore, UE#1 first transmits an RRC Connection Request message. In step S7011, the eNB replies to UE#1 with an RRC Connection Setup message. UE#1 is placed in the RRC connected mode (i.e., RRC_Connected), and transmits an RRC Connection Setup message including a TAU request message to the eNB in step S7012. Upon receipt of the RRC Connection Setup message, the eNB forwards the TAU Request message to MME#1.

In step S7013, MME#1 replies to UE#1 with a TAU Accept message. The TAU Accept message is forwarded to UE#1 through the eNB. The TAU Accept message includes a time/period value T1 at/with which UE#1 is to perform periodic location registration. Since there is no change in the time/period value T1 at/with which UE#1 performs periodic location registration, UE#1 may not provide location registration period information to the remote UE. That is, only when a previous value is changed, location registration period information may be provided. In this case, the remote UE performs periodic location registration to the network on the basis of previously provided information (i.e., T2 received in steps S705 and S709). In step S7014, upon expiration of a T2-based timer, UE#2 transmits a TAU Request message to MME#2. The TAU Request message is transmitted to MME#2 through UE#1 and the eNB. When performing periodic location registration to MME#2, UE#2 may provide the used location registration period value T2 to MME#2, thus requesting MME#2 to set T2 as a P-TAU period.

In step S7015, MME#2 replies to UE#2 with a TAU Accept message. In step S7016, upon expiration of a T3-based timer, UE#3 transmits a TAU Request message to MME#1. The TAU Request message is transmitted to MME#1 through the relay UE, UE#1 and the eNB. When performing periodic location registration to MME#1, UE#3 may provide the used location registration period value T2 to MME#1, thus requesting MME#1 to set T2 as a P-TAU period. In step S7017, MME#1 replies to UE#3 with a TAU Accept message.

Steps S7014 and S7016 may take place simultaneously. As a result of step S7015, UE#2 receives a period value for periodic location registration from MME#2. The period value may or may not be T2 that UE#2 has provided in step S7014. If the period value is not T2, UE#2 performs periodic location registration to the network on the basis of the period information received from UE#1. The same thing applies to UE#3.

Embodiment 1-2

Compared to Embodiment 1-1 in which remote UEs perform TAU, respectively, a relay UE performs TAU on behalf of a remote UE in Embodiment 1-2.

If a relay UE is already providing a relay service to any remote UE, the relay UE initiates a procedure of checking the reachability of the remote UE every period T2 less than or equal to T1. This operation may include one or more of 1) providing information about T2 to the remote UE, ii) transmitting a message for keep-alive to the remote UE (this may cause the remote UE to reply), and iii) instructing the remote UE to indicate whether it is reachable/kept alive to the relay UE. If the remote UE has been indicating periodically to the relay UE that the remote UE is reachable/kept alive, and the period of the indication is equal to T2, the relay UE may skip the above operation.

The remote UE transmits a message indicating its reachability to the relay UE every period T2 (upon or before expiration of a timer set to T2 after the T2 information is stored). The message may be in the form of a keep-alive message as described in section 5.4.5.3 (Layer-2 link maintenance over PC5) of TS23.303, or may be a newly defined message. If data or a signaling message is transmitted through the relay UE before the remote UE indicates its reachability to the relay UE, the remote UE may skip the operation of indicating its reachability. This is because with the data transmission or the signaling message transmission, the relay UE considers that the remote UE is reachable.

If a new remote UE requests the relay service to the relay UE, the relay UE provides one or more of the following pieces of information when or after the relay UE establishes a one-to-one connection to the remote UE.

i) Information about a time point/time (T3) at/during which the remote UE should indicate that it is reachable/kept alive at the next time. The time point/time information may specify an absolute time (e.g., xxxx(year) and/or xx(month) and/or xx(date) and/or xx(hour) and/or xx(minute)) or a relative time (e.g., after xx minutes). The information is intended for the relay UE to be notified that the remote UE is reachable/kept alive by the remote UE at or before a time when the next TAU is performed to an MME.

ii) Information about a periodicity (T2) with which the remote UE should periodically indicate to the relay UE that the remote UE is reachable/kept alive after T3.

The remote UE transmits a message indicating its reachability to the relay UE at or after time T3. The message may be in the form of, for example, a keep-alive message as described in section 5.4.5.3 (Layer-2 link maintenance over PC5) of TS23.303, or may be a newly defined message. If data or a signaling message is transmitted through the relay UE before the remote UE indicates its reachability to the relay UE, the remote UE may skip the operation of indicating its reachability. This is because the data transmission or the signaling message transmission causes the relay UE to consider that the remote UE is reachable. Further, upon or before expiration of the T2 timer, the remote UE transmits the message indicating its reachability to the relay UE. If a data transmission or a signaling message transmission takes place through the relay UE before the remote UE indicates its reachability to the relay UE on the basis of the period T2, the remote UE may skip the operation of indicating its reachability. This is because the data transmission or the signaling message transmission causes the relay UE to consider that the remote UE is reachable.

If the relay UE performs a TAU Request on behalf of the remote UE, the remote UE may receive emergency call-related information from the relay UE. If the emergency call-related information indicates that IMS emergency call is not supported, the remote UE may make an emergency call in CS RAT after RAT switching. This operation will be described later in detail in Embodiment 2.

When the relay UE performs periodic location registration to the MME, the relay UE also performs periodic location registration for a remote UE which has been confirmed to be reachable from among remote UEs to which the relay UE provides its relay service. Herein, the relay UE may perform periodic location registration to the MME on behalf of the remote UE in the following various manners.

i) After performing a TAU procedure for the relay UE itself, the relay UE performs the TAU procedure for each remote UE.

ii) After performing the TAU procedure for the relay UE itself, the relay UE performs the TAU procedure at one time for all remote UEs which are confirmed to be reachable.

iii) The relay UE performs the TAU procedure at one time for the relay UE itself and all remote UEs which are confirmed to be reachable.

In general, the MME performs S1 release immediately after the TAU procedure. In the cases of i) and ii), a plurality of TAU procedures should be performed successively, and the relay UE may transmit, to the MME, a TAU Request message with an Active flag set except for the last TAU procedure, in order to request the MME to maintain a signaling connection.

Figure 8:
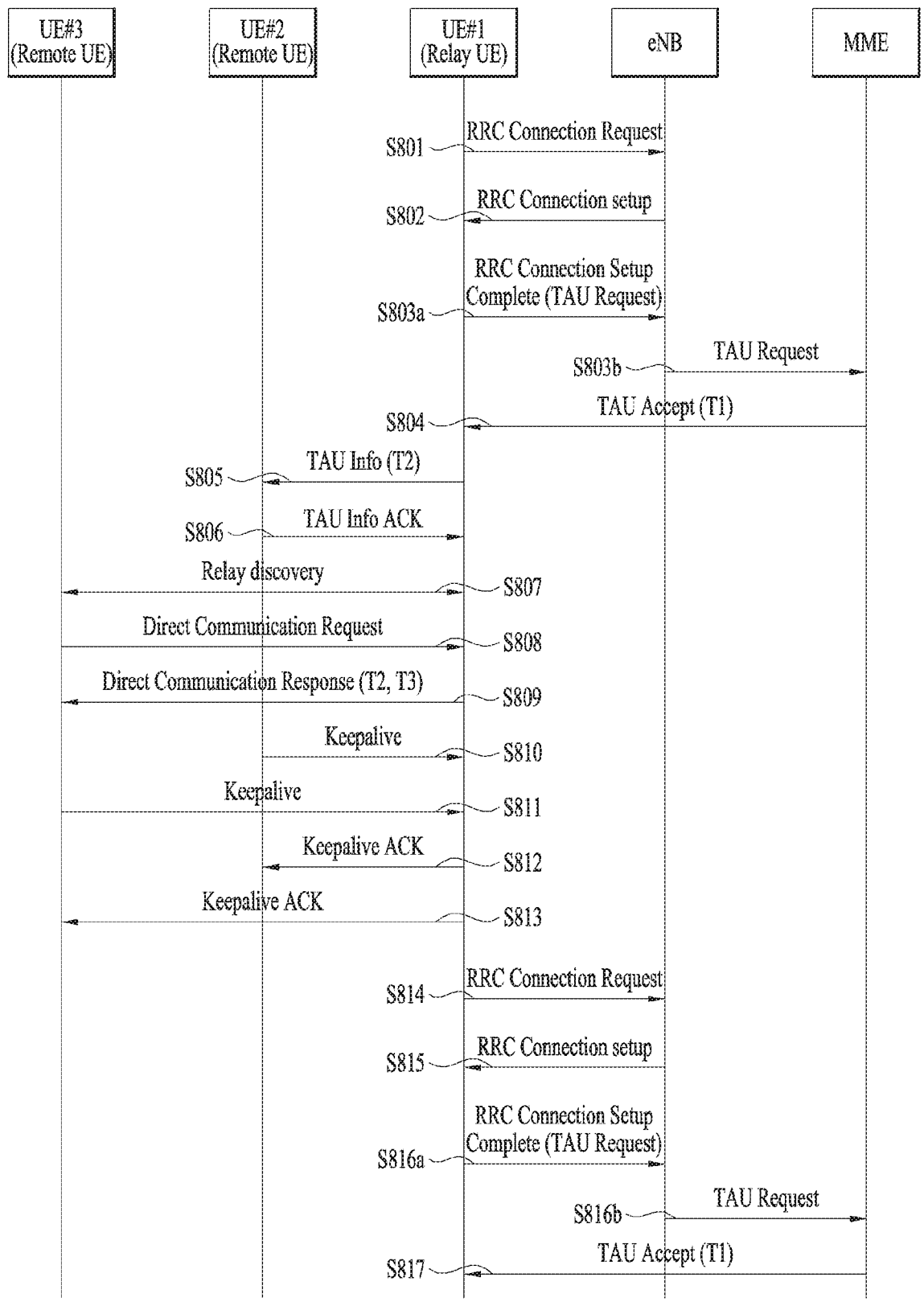

FIG. 8 illustrates a method of performing periodic location registration on behalf of a remote UE(s) by a relay UE. In FIG. 8, it is assumed that a relay UE-to-remote UE relationship has been established between UE#1 and UE#2.

In step S801, UE#1, which is in the RRC IDLE mode, transmits an RRC Connection Request message to an eNB in order to transition to the RRC connected mode. The eNB replies to UE#1 with an RRC Connection Setup message in step S802. In step S803, UE#1 is placed in the RRC connected mode (i.e., RRC_Connected), and transmits an RRC Connection Setup Complete message including a TAU Request message to the eNB. Upon receipt of the RRC Connection Setup Complete message, the eNB forwards the TAU Request message to an MME. The main cause of the transmission of the TAU Request message from UE#1 to the network is, but not limited to, periodic location registration. For example, movement-incurred location registration, a report caused by a change in the UE's capability/configuration, etc. are all included in the causes of the transmission of the TAU Request message from UE#1 to the network. In step S804, the MME replies to UE#1 with a TAU Accept message. The TAU Accept message is forwarded to UE#1 via the eNB. The TAU Accept message includes a time/period at/with which UE#1 is to perform periodic location registration, that is, T1.

In step S805, UE#1 transmits a message providing reachability check period information, TAU Info to UE#2 that provides the network connection service. The reachability check period information is T2. For details the T2 value, refer to the foregoing description. In step S806, UE#2 replies with a TAU Info ACK message.

In step S807, UE#3 searches for a relay UE in order to receive the network connection service. UE#3 transmits, to a selected relay UE, UE#1, a request for generating a one-to-one connection to UE#1, that is, a Direct Communication Request message in step S808. In step S809, UE#1 replies with a Direct Communication Response message. The message includes reachability check period information T2 for UE#3, and information T3 about a time point/time at which UE#3 is to indicate that it is reachable/kept alive. For details of T2 and T3 values, refer to the foregoing description.

As a T2-based timer expires, UE#2 transmits a Keepalive message to UE#1 in step S8010. In step S8011, upon expiration of a T3-based timer, UE#3 transmits a Keepalive message to UE#1. Steps S8010 and S8011 may take place simultaneously. UE#1 replies to UE#2 with a Keepalive ACK message in step S8012, and to UE#3 with a Keepalive ACK message in step S8013.

It is assumed that UE#1 is placed in the RRC IDLE mode after step S804. In step S8014, a T1-based timer expires, and thus UE#1 intends to perform location registration to the network. Therefore, UE#1 first transmits an RRC Connection Request message to the eNB. The eNB replies to UE#1 with an RRC Connection Setup message in step S8015. In step S8016, UE#1 is placed in the RRC connected mode (i.e., RRC_Connected), and transmits an RRC Connection Setup Complete message including a TAU Request message to the eNB. Upon receipt of the RRC Connection Setup Complete message, the eNB forwards the TAU Request message to the MME. The TAU Request message includes a request for location registration of all remote UEs which have been confirmed to be reachable, that is, UE#2 and UE#3, from among remote UEs that UE#1 provides the relay service. One of the above-described three methods may be performed, and in this embodiment, it is assumed that the method of iii), that is, the method of performing, at one time, a TAU procedure for a relay UE itself and all remote UEs which have been confirmed to be reachable is used, from among the above methods. In step S8017, the MME replies to UE#1 with a TAU Accept message. The TAU Accept message is forwarded to UE#1 through the eNB. The TAU Accept message includes a time/period value, T1 at/with which UE#1 is to perform periodic location registration. As the time/period value for periodic location registration has not been changed from a previous value, UE#1 may not provide reachability check period information to a remote UE. That is, the reachability check period information may be provided only when the previous value is changed. In this case, the remote UE may continuously perform a Keepalive operation to the relay UE on the basis of the previously received information (i.e., T2 received in steps S805 and S809).

While the serving MMEs of all UEs are shown as identical in FIG. 8, the same thing applies to a case in which the serving MMEs are different for the respective UEs. Particularly, if the serving MME of a relay UE is different from the serving MME of a remote UE, the former MME may indicate to the latter MME that the remote UE has performed location registration.

In the above description, when the relay UE provides T2 information to remote UEs, different T2 values may be set in order to prevent a plurality of remote UEs from indicating their reachability to the relay UE at the same time, and distribute the indications appropriately. In addition, while TAU has been mentioned as a location registration procedure and a message for the location registration procedure has been mentioned as a TAU Request message in the above description, a new type of procedure and/or message may be defined and used. In the above, a remote UE may store and then use period information provided by the relay UE. Although a network entity to which a UE registers its location has been described above as an MME, the network entity is not limited to an MME. In a NextGen System, any of various types of network entities to which location registration is performed (e.g., a control plane function performing mobility management, a RAN, an MM anchor node, etc.) may be used.

Embodiment 2

Embodiment 2 relates to a method of enabling a remote UE to efficiently use an emergency call. It has been described in Embodiment 1 that a remote UE receives emergency call-related information from a relay UE or an MME. The following description may be used as supplemental to the description of Embodiment 1, and further Embodiment 2 may be used as an independent method.

It may be determined from an Attach Accept message during attachment, and a TAU Accept message during TAU whether IMS emergency call is supported in a serving network of a legacy UE. Whether IMS emergency call is supported is indicated by emergency bearer services indicator (EMC BS) information in an EPS network feature support information element (IE) of the Attach Accept message and the TAU Accept message. An example of the EPS network feature support IE is illustrated in FIG. 13 and FIG. 14 below. For details, refer to TS 24.301.

Table 2 below describes a domain selection rule for an emergency session attempt in TS 23.167. In Table 2, for example, a serving network supports IMS emergency call, and a UE attempts an emergency call in its attached PS network in case A. In case C, a serving network does not support IMS emergency call, and a UE attaches itself to a CS network and attempts an emergency call in the CS network.

TABLE 2

| | CS Attached | PS Attached | VoIMS | EMS | First EMC Attempt | Second EMC Attempt |
|---|---|---|---|---|---|---|
| A | N | Y | Y | Y | PS | CS if available and supported |
| B | N | Y | N | Y | PS or CS if the emergency session includes at least voice. PS if the emergency session contains only media other than voice. | PS if first attempt in CS CS if first attempt in PS |
| C | N | Y | Y or N | N | CS if available and supported and if the emergency session includes at least voice. | No attempt is made in the PS domain |
| D | Y | N | Y or N | Y or N | CS if the emergency session includes at least voice. PS if available and EMS is "Y" and emergency session contains only media other than voice. | PS if available and EMS is "Y" |
| E | Y | Y | Y | Y | If the emergency session includes at least voice, follow rules in TS 22.101 [8] which say to use the same domain as for a non-EMC PS if the emergency session contains only media other than voice. | PS if first attempt in CS CS if first attempt in PS |
| F | Y | Y | Y or N | N | CS if the emergency session includes at least voice. | No attempt is made in the PS domain |
| G | Y | Y | N | Y | CS if the emergency session includes at least voice. PS if the emergency session contains only media other than voice. | PS |

EMC = Emergency Session. EMC includes also normal calls initiated in the CS domain that are treated by the CS CN as emergency calls.
VoIMS = Voice over IMS over PS sessions support as indicated by IMS Voice over PS session supported indication as defined in TS 23.401 [28] and TS 23.060 [2].
EMS = IMS Emergency Services supported as indicated by Emergency Service Support indicator as defined in TS 23.401 [28] and TS 23.060 [2].
NOTE:
If the UE selects the CS domain and initiates a normal call using the dialled local emergency number (see clause 7.1.2), and the UE enters limited service state (e.g. due to a Location Registration failing), then the UE camps on an acceptable cell (see TS 23.122 [41]) and may proceed with the EMC by initiating an emergency call in limited service state.

Figure 9:
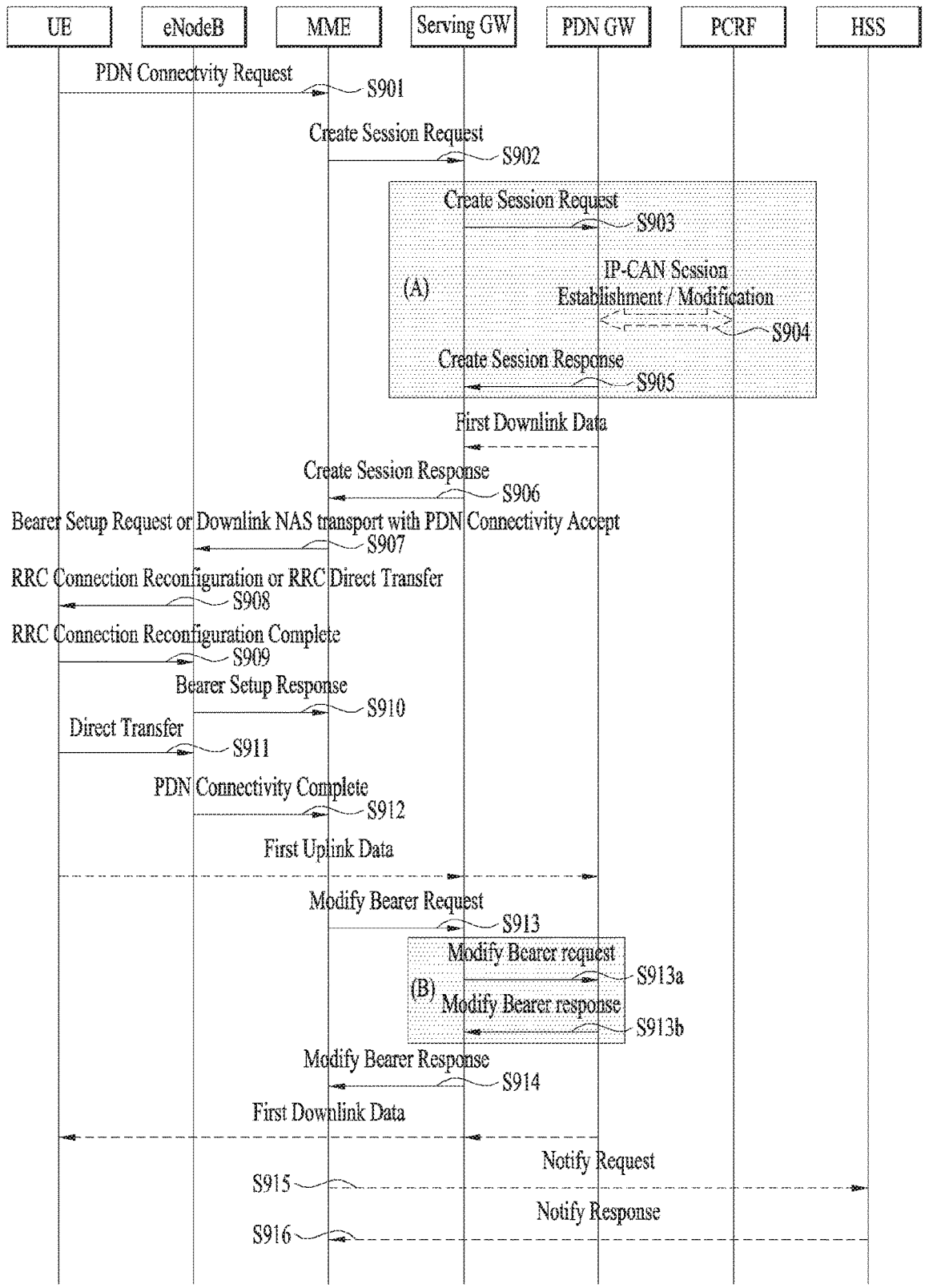
FIG. 9 is a view illustrating a packet data network (PDN) connection procedure.

In this manner, a UE may determine whether it is allowed to attempt an emergency call in a PS network depending on whether its serving network supports IMS emergency call. However, if the UE is a remote UE with an indirect 3GPP connection established through a relay UE, and intends to make an emergency call, the UE has no way to know whether the network supports IMS emergency call, when the UE is directly connected to the network. Therefore, even though the network does not support IMS emergency call, the UE may unconditionally attempt an emergency call in the PS network. The attempt results in failure of the emergency call accompanied by an attempt of an emergency call in a CS network. As a consequence, the requirement of the emergency call that the service should be provided urgently is not satisfied, and user experience is adversely affected. FIG. 9 illustrates a PDN connection procedure. In step S901, a UE transmits a PDN Connectivity Request message with Request Type set to Emergency to an MME in order to make an emergency call. However, if the MME is configured not to support a PDN connection for an emergency call, the MME transmits a message indicating rejection of the request to the UE. In this case, the UE cannot help attempting an emergency call again in the CS network. This problem may not occur in the case where a remote UE performs Attach and TAU procedures directly to a network despite reception of a service through a relay UE, and in the case where the remote UE performs the Attach and TAU procedures to the network through the relay UE. However, considering that a wearable device is mainly discussed as an example of a remote UE and such a terminal is preferably efficient in power consumption and simple in operation, it may be efficient for the remote UE to reduce signaling (the signaling may mean NAS signaling and/or AS signaling. Further, the signaling may mean signaling through the relay UE as well as signaling via LTE-Uu) with the network while being serviced through the relay UE. Therefore, an emergency call-related procedure/method that can solve the above problem will be described below.

A relay UE may provide a remote UE with one or more of the following pieces of emergency call-related information i) to ix).

i) Information indicating whether the network supports IMS emergency call: included in Attach Accept and TAU Accept messages.

ii) Information indicating whether the network supports IMS voice: included in Attach Accept and TAU Accept messages.

iii) Information about its serving PLMN (the ID (MCC+MNC) or E-UTRAN cell global identifier (ECGI) information of the serving PLMN).

iv) The identify of a tracking area in which the relay UE is located (i.e., a TAI).

v) A TAI list received from an MME after TAU.

vi) Information acquired from the network, in relation to an emergency call, for example, an emergency number list.

vii) Information indicating whether the relay UE supports IMS emergency call.

viii) Information indicating whether the relay UE supports IMS voice.

ix) Information indicating whether an emergency call is allowed to be (is to be) performed through a relay UE (this information may be interpreted as information indicating whether the emergency call is to be made through a direct connection to the network).

The information of i) and vii) may be provided in an integrated form indicating support of IMS emergency call. For example, only when both i) and vii) are satisfied, i) or vii) may be provided. The information of ii) and viii) may be provided in an integrated form indicating support of IMS voice. For example, only when both ii) and viii) are satisfied, ii) or viii) may be provided.

The above information may be provided to a remote UE at or more of the following time points a) to g). Herein, the remote UE may be any of a UE searching for a relay UE, a UE which has not established a relay UE-to-remote UE relationship with a relay UE, and a UE which has established a relay UE-to-remote UE relationship with a relay UE.

a) When the remote UE establishes a one-to-one link (or one-to-one direct communication) with the relay UE.

b) After the remote UE establishes the one-to-one link (or one-to-one direct communication) with the relay UE.

c) When the remote UE is attached to the relay UE.

d) After the remote UE is attached to the relay UE.

e) During a discovery operation in which the relay UE notifies other UEs that the relay UE supports relay.

f) When a change occurs to the above information.

g) When the remote UE requests the above information.

The above information may be provided to the remote UE by various messages. For example, a legacy PC5-S message, a newly defined PC5-S message, a direct discovery message, etc. may be available in delivering the above information. Upon receipt of the emergency call-related information from the relay UE, the remote UE stores the received emergency call-related information.

The remote UE may acquire emergency call-related information from the network. The network may be either or both of an MME and an eNB. The emergency call-related information may be one or more of the above pieces of information. Further, the information may be information acquired from the MME in legacy Attach and TAU procedures, information acquired from the eNB, and/or newly defined information for the present invention. The remote UE may acquire the emergency call-related information by performing an Attach or TAU operation directly to the network (before or after receiving the service from the relay UE), or by performing the Attach or TAU operation to the network through the relay UE. When the remote UE needs to acquire the emergency call-related information from the eNB, the remote UE may acquire the emergency call-related information directly from the eNB (before or after receiving the service through the relay UE), or from the eNB through the relay UE. Part of the emergency call-related information may have been configured in the UE.

When the remote UE, which has acquired the above-described information, intends to make an emergency call, the remote UE may make the emergency call in one or more of the following methods on the basis of information received from the relay UE and/or information received from the network and/or information configured in the UE.

If IMS emergency call is supported (either or both of the foregoing i) and iv) in the emergency call-related information are satisfied), an emergency call is attempted to a PS network through the relay UE. The emergency call may be attempted through the relay UE on the basis of the emergency call-related information ix). However, the remote UE may always attempt the emergency call through the relay UE irrespective of this information.

If IMS emergency call is supported (either or both of the foregoing i) and vii) in the emergency call-related information are satisfied), an emergency call is attempted directly to the PS network without intervention of the relay UE. The remote UE may always attempt the emergency call directly to the network irrespective of this information. For this purpose, the remote UE may attempt the emergency call after performing an operation of selecting a PLMN and/or cell servicing the relay UE.

If IMS emergency call is not supported (at least one of the foregoing i) and vii) in the emergency call-related information is not satisfied), an emergency call is attempted directly to a CS network. If the remote UE has not been attached to the CS network, the remote UE attaches itself to the CS network and then makes the emergency call.

While the operation of a remote UE for making an emergency call has been described above, the above description may be extended to an operation of a remote UE, related to IMS voice call. That is, only when support of IMS voice call is indicated by a relay UE, a remote UE may perform IMS registration.

Figure 10:
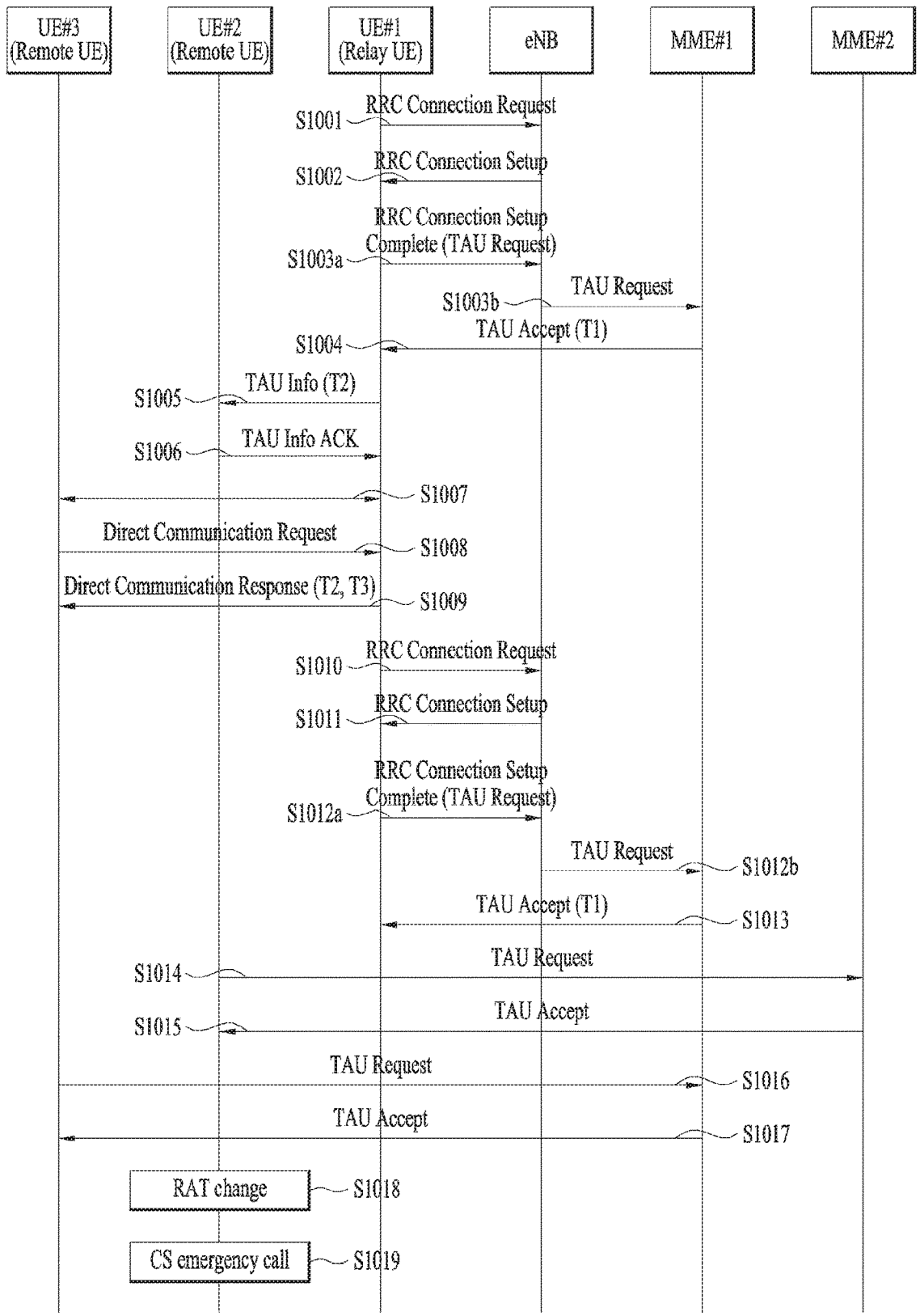
FIGS. 10 and 11 are views illustrating procedures related to emergency call processing according to an embodiment of the present invention.
Figure 11:
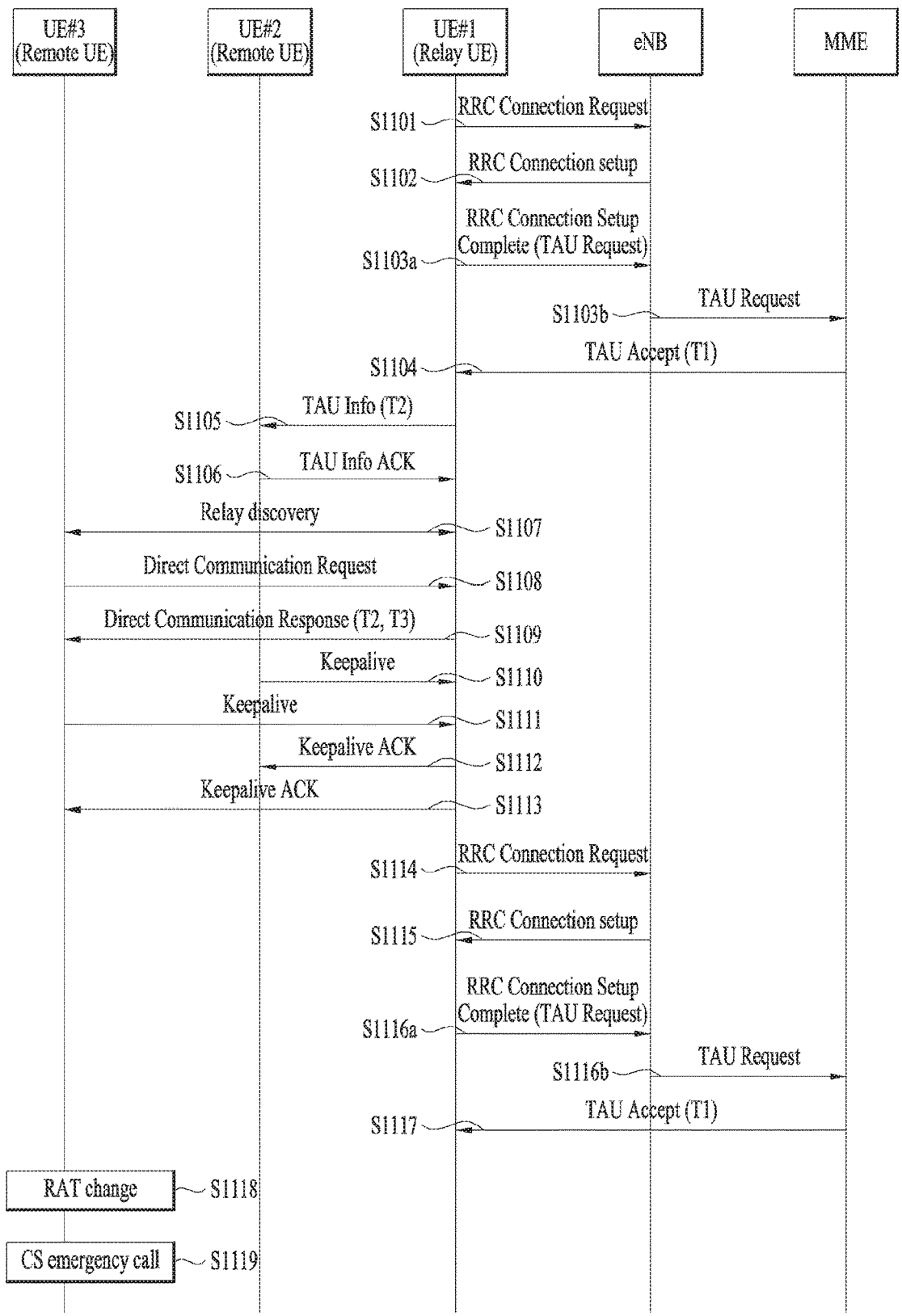

FIGS. 10 and 11 illustrate that an emergency call procedure is added to the above-described Embodiment 1-1 and Embodiment 1-2. Aside from the following description, each step is performed in the same manner as described in Embodiment 1-1 and Embodiment 1-2.

Referring to FIG. 10, UE#2 acquires the afore-described emergency call-related information from MME#2 in step S1015. In step S1017, UE#3 acquires the afore-described emergency call-related information from MME#3. UE#2 is to make an emergency call in step S1018. However, it is determined that IMS emergency call is not supported according to the information provided in step S1015. Thus, UE#2 switches RAT from E-UTRAN to GERAN or UTRAN. If UE#2 has not been attached to a CS network yet, UE#2 attaches itself to the CS network. Likewise, UE#3 is to make an emergency call. However, it is determined that IMS emergency call is not supported according to the information received in step S1017. Thus, UE#3 switches RAT from E-UTRAN to GERAN or UTRAN. If UE#3 has not been attached to the CS network yet, UE#3 attaches itself to the CS network. Subsequently, UE#3 makes an emergency call to the CS network.

Referring to FIG. 11, UE#1 may include one or more of the above-described pieces of emergency call-related information in a TAU Info message directed to UE#2 in step S1105. In step S1109, UE#1 may include one or more of the above-described pieces of emergency call-related information in a Direct Communication Response message directed to UE#3. In step S1108, UE#3 is to make an emergency call. However, it is determined that IMS emergency call is not supported according to the information received in step S1109. Thus, UE#3 switches RAT from E-UTRAN to GERAN or UTRAN. If UE#3 has not been attached to the CS network yet, UE#3 attaches itself to the CS network. In step 1109, UE#3 makes an emergency call to the CS network. Likewise, UE#2 is to make an emergency call. However, it is determined that IMS emergency call is not supported according to the information received in step S1105. Thus, UE#2 switches RAT from E-UTRAN to GERAN or UTRAN. If UE#2 has not been attached to the CS network yet, UE#2 attaches itself to the CS network. Subsequently, UE#2 makes an emergency call to the CS network.

Embodiment 3

Embodiment 3 relates to a method of efficiently providing quality of service (QoS). The method includes a combination of one or more of the following operations. The present invention is based on the assumption of using a scheduled resource allocation method (mode 1 for proximity services (ProSe) direct communication) for a PC5 operation. However, the present invention is not limited thereto, and is applicable to a method of allocating PC5 resources by an eNB.

The eNB manages logical channel groups (LCGs) by mapping the LCGs to PC5 bearers. Herein, one LCG may correspond to one PC5 bearer, or a plurality of LCGs may correspond to one PC5 bearer. In Rel-13 ProSe, four LCGs are assumed, which is not the premise of the present invention. PC5 bearers may be managed by assigning QoS class indicator (QCI) numbers to the PC5 bearers.

Basically, there is a mapping relationship between LCG IDs and priority levels (or ProSe per-packet priority (PPPP) levels), and thus the eNB may consider that PC5 bearers are managed by mapping the PC5 bearers to PPPPs. When the eNB provides mapping information between PPPPs and PC5 bearers to a UE, the eNB may configure and provide the mapping information in consideration of the following characteristics of PC5 bearers.

The eNB may have QoS characteristics to be satisfied for the PC5 bearers, and the QoS characteristics may be one or more of the following QoS characteristics. This information may all be configured in the eNB or acquired from another network node (e.g., an OAM node).
  i) Resource Type=GBR or Non-GBR
  ii) Priority Level
  iii) Packet Delay Budget
  iv) Packet Error Loss Rate
  v) ARP
  vi) if Resource Type is GBR, a maximum bit rate value and/or a guaranteed bit rate value
  vii) if Resource Type is non-GBR, an AMBR value applied to all non-GBR PC5 bearers
  viii) Prioritized Bit Rate: a prioritized bit rate for logical channel prioritization in TS 36.321. The value may be in kilobytes/seconds.
  ix) Bucket Size duration: a bucket size duration for logical prioritization ins TS 36.321. The value may be in milliseconds.

As described above, a PC5 bearer mapped to an LCG may be of the GBR type or the non-GBR type. For example, PC5 bearers may be managed such that if LCG ID=0 or 1, the PC5 bearer is a GBR bearer, and if LCG ID=2 or 3, the PC5 bearer is a non-GBR bearer.

QoS characteristics corresponding to the PC5 bearers may be managed/applied irrespective of the types/roles of UEs, and different QoS characteristic sets may be managed/applied according to the types/roles of UEs.

The eNB may identify the type/role of a UE using one or more of the following pieces of information.
  a) The MME explicitly or implicitly provides information about the type/role of the UE to the eNB. The information may be provided (explicitly or implicitly) along with V2X Service Authorization information for the UE.
  b) When the UE requests PC5 resources to the eNB, the UE may explicitly or implicitly provide information about its type/role to the eNB.
  c) The UE may explicitly or implicitly provide information about its type/role to the eNB by an RRC message.

The above description is based on the assumption that an LCG infer that priority information of a sidelink buffer status report (BSR) that a UE transmits to an eNB to request PC5 resources, as in Rel-13 ProSe, which should not be construed as limiting the present invention. In this regard, when the UE requests PC5 resources to the eNB, the UE may include priority information about a message to be transmitted in a request message. In this case, it is considered that PC5 bearers managed by the eNB are mapped to priority levels, not LCGs.

A PC5 bearer as used in the present invention may refer to a PC5 radio bearer.

Now, a description will be given of a method of providing QoS in the context of an operation of each network node on the basis of the above description.

The eNB configures a mapping relationship between LCG IDs and PPPP levels in consideration of the characteristics of PC5 bearers, and provides the mapping relationship to the UE. Herein, the eNB may provide the UE with one or more of the QoS characteristics (the afore-described i) to ix)) of PC5 bearers corresponding to the respective LCGs (or PPPPs).

The UE transmits a sidelink BSR to the eNB in order to transmit a V2X message. Herein, the UE configures an LCG ID corresponding to PPPP information about the V2X message, using the mapping information between PPPPs and LCG IDs, acquired from the eNB.

Upon receipt of the sidelink BSR from the UE, the eNB determines/derives a PC5 bearer mapped to the LCG ID. The eNB determines whether to grant PC5 resources for the UE by applying a QoS characteristic corresponding to the PC5 bearer. Once the eNB determines to grant the PC5 resources, the eNB transmits the grant to the UE.

Upon receipt of the grant for the PC5 resources, the UE transmits the V2X message. If the UE has acquired a QoS characteristic corresponding to the LCG (or PPPP), the UE may apply the QoS characteristic to the V2X message transmission. For the operation, the eNB may have stored information about histories of PC5 resources allocated to specific UEs.

While the present invention has been described above in the context of the V2X service, the present invention is also applicable to all services using D2D communication. Accordingly, Embodiment 3 is also applicable to D2D communication of a relay UE and/or a remote UE in Embodiment 1 and Embodiment 2.

Figure 12:
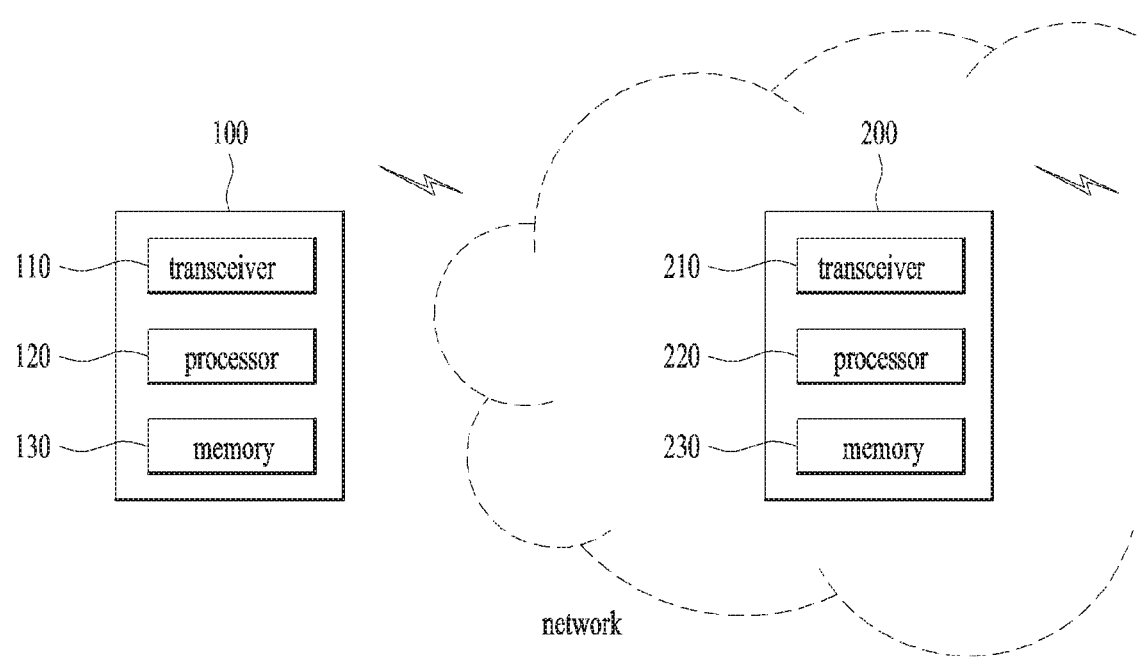
FIG. 12 is a block diagram of a node apparatus according to an embodiment of the present invention.

FIG. 12 is a block diagram of a preferred embodiment of a UE and a network node according to an example of the present invention.

Referring to FIG. 12, a UE 100 according to the present invention may include a transceiver 110, a processor 120, and a memory 130. The transceiver 110 may be configured to transmit various signals, data, and information to an external device, and to receive various signals, data, and information from the external device. The UE 100 may be connected wiredly and/or wirelessly to the external device. The processor 120 may provide overall control to the UE 100, and may be configured to compute and process information that the UE 100 transmits to and receive from the external device. The memory 130 may store computed and processed information for a predetermined time, and may be replaced with a component such as a buffer (not shown).

Referring to FIG. 12, a network node 200 according to the present invention may include a transceiver 210, a processor 220, and a memory 230. The transceiver 210 may be configured to transmit various signals, data, and information to an external device, and to receive various signals, data, and information from the external device. The network node 200 may be connected wiredly and/or wirelessly to the external device. The processor 120 may provide overall control to the network node 200, and may be configured to compute and process information that the UE 100 transmits to and receive from the external device. The memory 230 may store computed and processed information for a predetermined time, and may be replaced with a component such as a buffer (not shown). Further, the processor 220 may be configured to perform network node operations proposed in the present invention. Specifically, the processor 220 may determine to maintain a UE that performs only a PC5 operation in an ECM_CONNECTED state, and transmit information requesting release of part of a PDN connection to a second network node via the transceiver.

Further, the afore-mentioned specific configurations of the UE 100 and the network node 200 may be implemented such that the above-described various embodiments of the present disclosure are independently applied or two or more thereof are simultaneously applied, and description of redundant parts is omitted for clarity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present invention have been described above in the context of a 3GPP system, the present invention is applicable in the same manner to various mobile communication systems.

What is claimed is:

1. A method of performing location registration by a remote user equipment (UE) in a wireless communication system, the method comprising:
    transmitting a direct communication request message to a relay UE;
    receiving, from the relay UE, a direct communication response message including location registration period information and location registration action time information in response to the direct communication request message; and
    transmitting a first tracking area update (TAU) request message to a mobility management entity (MME), upon expiration of the location registration action time information,
    wherein the location registration period information is applied after the location registration action time information is applied, and
    wherein, after transmitting the first TAU request message, the remote UE transmits a second TAU request message after expiration of a time corresponding to the location registration period information.

2. The method according to claim 1, wherein the location registration period information is a time period starting from the expiration of the location registration action time information.

3. The method according to claim 1, wherein the location registration action time information corresponds to a time from transmission of the direct communication response message to initiation of a TAU procedure at the relay UE.

4. The method according to claim 1, wherein the first TAU request message includes the location registration period information.

5. The method according to claim 4, wherein the location registration period information included in the first TAU request message is a period configuration request for the MME receiving the first TAU request message.

6. The method according to claim 5, wherein the MME of the remote UE is different from an MME of the relay UE.

7. The method according to claim 1, wherein the first TAU request message is transmitted through the relay UE.

8. The method according to claim 1, wherein if the MME of the remote UE is identical to an MME of the relay UE, the remote UE receives emergency call-related information from the relay UE.

9. The method according to claim 1, wherein the remote UE receives, from the MME, a TAU response message including emergency call-related information in response to the transmitted TAU request message.

10. The method according to claim 1, wherein if the emergency call-related information indicates that IP multimedia subsystem (IMS) emergency call is not supported, the remote UE performs radio access technology (RAT) switching.

11. The method according to claim 10, wherein the remote UE makes an emergency call in a switched RAT after the RAT switching.

12. A remote user equipment (UE) for performing location registration in a wireless communication system, the remote UE comprising:
- a transceiver; and
- a processor operatively connected to the transceiver,
- wherein the processor is configured to:
  - control the transceiver to transmit a direct communication request message to a relay UE,
  - control the transceiver to receive, from the relay UE through the transceiver, a direct communication response message including location registration period information and location registration action time information in response to the direct communication request message, and
  - upon expiration of the location registration action time information, control the transceiver to transmit a first tracking area update (TAU) request message to a mobility management entity (MME),
- wherein the location registration period information is applied after the location registration action time information is applied, and
- wherein, after transmitting the first TAU request message, the remote UE transmits a second TAU request message after expiration of a time corresponding to the location registration period information.

13. The remote UE according to claim 12, wherein the location registration period information is a time period starting from the expiration of the location registration action time information.

* * * * *